(12) United States Patent
Tamura et al.

(10) Patent No.: US 11,012,935 B2
(45) Date of Patent: May 18, 2021

(54) CONTROL APPARATUS, PAGING METHOD, AND NON-TRANSITORY COMPUTER-READABLE MEDIUM

(71) Applicant: NEC Corporation, Tokyo (JP)

(72) Inventors: Toshiyuki Tamura, Tokyo (JP); Kouji Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/340,052

(22) PCT Filed: Oct. 6, 2017

(86) PCT No.: PCT/JP2017/036404
§ 371 (c)(1),
(2) Date: Apr. 5, 2019

(87) PCT Pub. No.: WO2018/066683
PCT Pub. Date: Apr. 12, 2018

(65) Prior Publication Data
US 2020/0037243 A1    Jan. 30, 2020

(30) Foreign Application Priority Data
Oct. 7, 2016    (JP) .............................. JP2016-199094

(51) Int. Cl.
*H04W 52/02*    (2009.01)
*H04W 68/02*    (2009.01)
(Continued)

(52) U.S. Cl.
CPC ... *H04W 52/0216* (2013.01); *H04W 52/0229* (2013.01); *H04W 68/02* (2013.01);
(Continued)

(58) Field of Classification Search
CPC ......... H04W 52/0216; H04W 52/0229; H04W 68/02; H04W 76/28; H04W 24/02; H04W 68/00; Y02D 70/00; Y02D 70/20
See application file for complete search history.

(56) References Cited

U.S. PATENT DOCUMENTS

2019/0029000 A1* 1/2019 Vikberg ................ H04W 68/00
2019/0053037 A1* 2/2019 Shu ...................... H04W 68/00
(Continued)

OTHER PUBLICATIONS

RAN2 "LS on eDRX Paging Hyper-frame and PTW_Start Calculation", 3GPP TSG RAN WG3 Meeting #93bis, R3-162279, Sophia Antipolis, France, Oct. 10-14, 2016, 2 pages.
(Continued)

*Primary Examiner* — Brian T O Connor

(57) ABSTRACT

A purpose is to provide a control apparatus capable of advancing performing a paging process when packet arrival occurs while the control apparatus arranged in a core network holds two Temporary IDs regarding a communication terminal. A control apparatus (10) according to the present disclosure includes a communication means (12) for preforming a paging process using extended idle-mode Discontinuous Reception (DRX) (eDRX) and a calculation means (11) for determining a timing for paging using a first temporary identifier allocated to a communication terminal (30) and a second temporary identifier allocated to the communication terminal (30) and different from the first temporary identifier, in which the communication means (12) performs a paging process using the first temporary identifier corresponding to a first timing for initial paging.

12 Claims, 17 Drawing Sheets

(51) Int. Cl.
*H04W 76/28* (2018.01)
*H04W 24/02* (2009.01)
*H04W 68/00* (2009.01)

(52) U.S. Cl.
CPC ............ *H04W 24/02* (2013.01); *H04W 68/00* (2013.01); *H04W 76/28* (2018.02)

(56) References Cited

U.S. PATENT DOCUMENTS

2019/0313475 A1* 10/2019 Siomina ................ H04W 76/28
2019/0349855 A1* 11/2019 Dinan ............... H04W 52/0216
2020/0008262 A1* 1/2020 Dinan ................. H04W 52/365

OTHER PUBLICATIONS

Extended European Search Report issued in European Patent Application No. 17858519.6, dated Jul. 5, 2019, 8 pages.
3GPP TS 23.401 V13.5.0 (Dec. 2015); 3rd Generation Partnership Project; Technical Specification Group Services and System Aspects;General Packet Radio Service (GPRS) enhancements for Evolved Universal Terrestrial Radio Access Newtork (E-UTRAN) access (Release 13), 337 pages.
3GPP TS 23.401 V14.1.0 (Sep. 2016), 3rd Generation Partnership Project; Technical Specification Group Services and System Aspects; General Packet Radio Service (GPRS) enhancements for Evolved Universal Terrestrial Radio Access Network (EUTRAN) access (Release 14); 378 pages.
3GPP TS 24.301 V14.1.0 (Sep. 2016),3rd Generation Partnership Project; Technical Specification Group Core Network and Terminals; Non-Access-Stratum (NAS) protocol for Evolved Packet System (EPS); Stage 3 (Release 14), 460 pages.
Huawei, HiSilicon, Extended buffering at MME in PSM & eDRX for CIoT CP optimization, 3GPP TSG CT WG1 Meeting #99, C1-163490, Jul. 29, 2016; 4 pages.
NEC, Paging with TMSI for eDRX UE, 3GPP TSG CT1 Meeting #100, C1-164174, Oct. 21, 2016; 10 pages.
Ericsson, NTT Docomo, Inc., PH and PTW_Start calculation for eDRX paging, 3GPP TSG-RAN2 Meeting #95, R2-165778, Aug. 26, 2016, 5 pages.
NTT Docomo, Inc., Abnormal case for eDRX configuration, 3GPP TSG-RAN3#93bis, R3-162483, Oct. 1, 2016, 2 pages.
International Search Report corresponding to PCT/JP2017/036404, dated Dec. 19, 2017, 5 pages.
3GPP 3rd Generation Partnership Project; Technical Specification Group Core Network and Terminals; Non-Access-Stratum (NAS) Protocol for Evolved Packet System (EPS); Stage 3 (Release 14), 3GPP TS 24.301 V14.0.1 (Jun. 2016), Jun. 2016, pp. 1-452.
Japanese Notice of Reasons for Refusal issued in Japanese Patent Application No. 2016-199094, dated Aug. 18, 2020, 8 pages.

* cited by examiner

CONTROL APPARATUS, PAGING METHOD, AND NON-TRANSITORY COMPUTER-READABLE MEDIUM

CROSS-REFERENCE TO RELATED APPLICATIONS

This application is a national stage application of International Application No. PCT/JP2017/036404 entitled "CONTROL APPARATUS, PAGING METHOD, AND NON-TRANSITORY COMPUTER-READABLE MEDIUM," filed on Oct. 6, 2017, which claims the benefit of the priority of Japanese Patent Application No. 2016-199094 filed on Oct. 7, 2016, the disclosures of each of which are hereby incorporated by reference in their entirety.

TECHNICAL FIELD

The present disclosure relates to a control apparatus, a paging method, and a program, and particularly relates to a control apparatus, a paging method, and a program that control a paging timing.

BACKGROUND ART

In the 3rd Generation Partnership Project (3GPP), which defines standards regarding mobile networks, a Tracking Area Update (TAU) procedure is defined. The Tracking Area Update (TAU) procedure is performed in order for a User Equipment (UE), which is a communication terminal, to notify a Mobility Management Entity (MME), which is a control apparatus, of a change of a Tracking Area (TA). The TAU procedure is defined in detail in, for example, Section 5.3.3.1 in Non Patent Literature 1. In the TAU procedure, as an identifier of a UE, a Globally Unique Temporary UE Identity (GUTI), which is a Temporary Identity (ID) allocated to the UE by the MME in advance, is used without using an International Mobile Subscriber Identity (IMSI), which is an identifier unique to the UE. It is desired that the GUTI is periodically changed in terms of security. Thus, the GUTI is changed in a GUTI Reallocation procedure (see Section 5.3.7 in Non Patent Literature 1) performed in parallel with the TAU procedure. The changed GUTI is notified to the UE in the TAU procedure.

In the TAU procedure, the MME transmits a TAU Accept message containing the changed GUTI to the UE, thereby notifying the UE of the changed GUTI. The UE transmits a TAU Complete message as a response to the TAU Accept message to the MME. The MME receives the TAU Complete message, thereby recognizing that the changed GUTI is notified to the UE.

Next, the packet arrival operation defined in the 3GPP is explained. In, for example, Section 5.3.4.3 in Non Patent Literature 1, a Network (NW) Triggered Service Request procedure is defined as a specific example of the packet arrival operation. In the NW Triggered Service Request procedure, the MME transmits a Paging message to an evolved NodeB (eNB), which is a base station. When receiving the Paging message, the eNB performs paging for the UE. Thus, packet arrival is notified to the UE.

The MME sets a System Architecture Evolution (SAE) Temporary Mobile Subscriber Identity (S-TMSI) consisting a part of a GUTI in a Paging message to identify a UE which is the destination of the packet arrival. In the following, the relation between the GUTI and the S-TMSI is explained.

The GUTI contains a Mobile Country Code (MCC), a Mobile Network Code (MNC), an MME Group ID, an MME Code, and an MME (M)-TMSI. Meanwhile, the S-TMSI contains the MME Code and the M-TMSI. That is, the S-TMSI contains the MME Code and the M-TMSI which constitute a part of the GUTI. The M-TMSI is an identifier to be changed in the GUTI Reallocation procedure. That is, by performing the GUTI Reallocation procedure, the S-TMSI containing the M-TMSI is also changed.

Next, the packet arrival operation in a normal case/abnormal case defined in the 3GPP is explained. For example, the MME does not receive, in the TAU procedure, a TAU Complete message to be transmitted from the UE due to signal loss in radios sections in some cases. In such a case, the MME cannot determine whether the UE is notified of the changed GUTI (hereinafter, referred to as a new GUTI). Thus, when the MME does not receive a TAU Complete message in the TAU procedure, the MME temporarily holds the GUTI before the change (hereinafter, referred to as an old GUTI) and the new GUTI. In this situation, when packet arrival occurs in the UE, the MME transmits, to the eNB, a Paging message using the new S-TMSI containing the M-TMSI contained in the new GUTI and the old S-TMSI containing the M-TMSI contained in the old GUTI. Non Patent Literature 2 discloses that when holding the old GUTI and the new GUTI, the MME first performs paging using the old S-TMSI. Non Patent Literature 2 further discloses that when there is no response to the paging using the old S-TMSI, the MME performs paging using the new S-TMSI.

Citation List

Non Patent Literature

Non Patent Literature 1: 3GPP TS23.401 V14.1.0 (2016-09), Sections 5.3.3.1 and 5.3.4.3
Non Patent Literature 2: 3GPP TS24.301 V14.1.0 (2016-09), Section 5.4.1.6

SUMMARY OF INVENTION

Technical Problem

However, when packet arrival occurs in a UE while an MME holds an old GUTI and a new GUTI, the following can be a problem.

A timing for performing paging using the old S-TMSI is different from a timing for performing paging using the new S-TMSI. A timing for paging is specified by, for example, the System Frame Number (SFN). Here, although a timing for paging using the new S-TMSI is earlier than that using the old S-TMSI, it is defined that paging using the old S-TMSI is performed first, and a paging process at the earlier timing for paging is not performed. In this case, a paging process is not performed until the later paging timing, and performing the paging process is delayed.

Here, a timing for paging is defined according to a Discontinuous Reception (DRX) cycle. Thus, the period between the earlier (the first) timing for paging and the later (the second) timing for paging can be the maximum value of the DRX cycle. The maximum value of the DRX cycle is 2.56 seconds, but the maximum value of an Extended Idle Mode DRX (eDRX) cycle, which is mainly adopted to Internet of Things (IoT) terminals, is about 43 minutes. Thus, when a paging process is performed at the later (the second) timing for paging, the influence of the problem that performing a paging process is delayed is more increased especially when the eDRX is adopted.

The present disclosure is to provide a control apparatus, a paging method, and a program that are capable of preventing delay in a paging process when packet arrival occurs while the control apparatus arranged in a core network holds two Temporary IDs regarding a communication terminal.

Solution to Problem

A control apparatus according to a first aspect of the present disclosure is a control apparatus including a communication means for performing a paging process using extended idle-mode Discontinuous Reception (DRX) (eDRX), and a calculation means for determining a timing for paging using a first temporary identifier allocated to a communication terminal and a second temporary identifier allocated to the communication terminal and different from the first temporary identifier, in which the communication means performs a paging process using the first temporary identifier corresponding to a first timing for initial paging.

A paging method according to a second aspect of the present disclosure is a paging method using extended idle-mode Discontinuous Reception (DRX) (eDRX), the method includes determining a timing for paging using a first temporary identifier allocated to a communication terminal and a second temporary identifier allocated to the communication terminal and different from the first temporary identifier, and performing a paging process using the first temporary identifier corresponding to a first timing for initial paging.

A program according to a third aspect of the present disclosure is a program causing a computer to perform a paging process using extended idle-mode Discontinuous Reception (DRX) (eDRX), the program causing the computer to determine a timing for paging using a first temporary identifier allocated to a communication terminal and a second temporary identifier allocated to the communication terminal and different from the first temporary identifier, and perform a paging process using the first temporary identifier corresponding to a first timing for initial paging.

Advantageous Effects of Invention

According to the present disclosure, it is possible to provide a control apparatus, a paging method, and a program that are capable of preventing delay in a paging process when packet arrival occurs while the control apparatus arranged in a core network holds two Temporary IDs regarding a communication terminal.

DESCRIPTION OF EMBODIMENTS

First Embodiment

Figure 1:
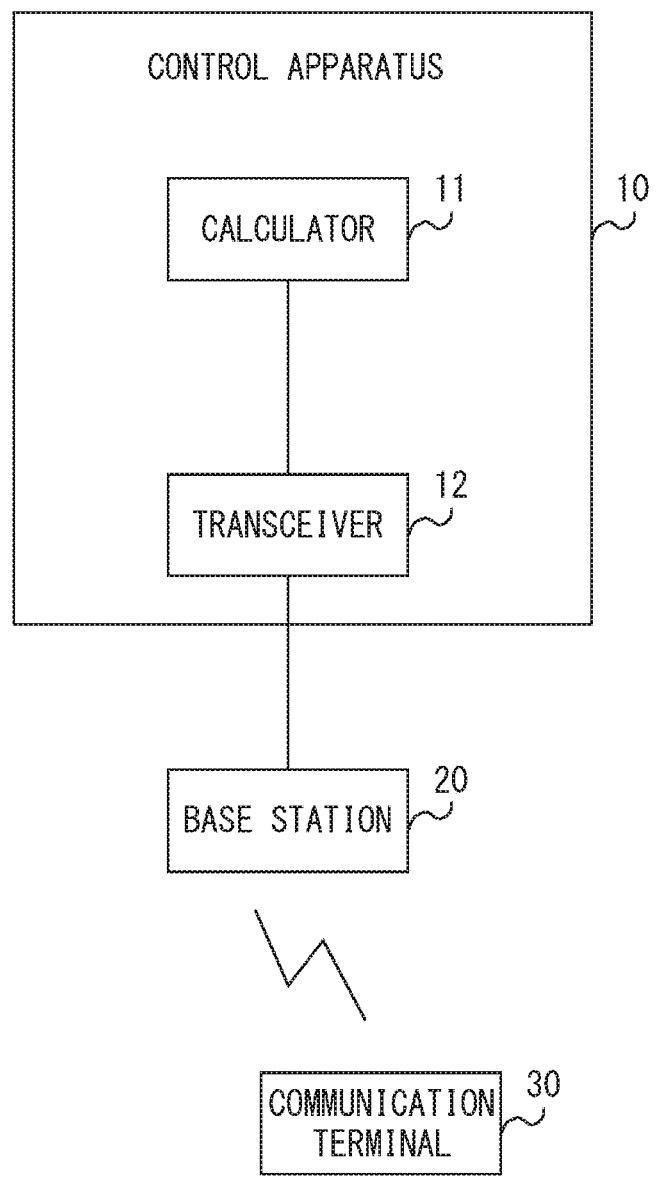
FIG. 1 is a configuration diagram of a communication system according to a first embodiment.

Hereinafter, embodiments of the present disclosure are described with reference to the drawings. With reference to FIG. 1, a configuration example of a communication system according to a first embodiment is described below. The communication system in FIG. 1 includes a control apparatus 10, a base station 20, and a communication terminal 30. The control apparatus 10, the base station 20, and the communication terminal 30 may each be a computer device operated by a processor executing programs stored in a memory.

The communication terminal 30 may be a mobile phone terminal, a smartphone terminal, a tablet terminal, or the like. Alternatively, the communication terminal 30 may be an Internet of Things (IoT) terminal, a Machine to Machine (M2M) terminal, or a Machine Type Communication (MTC) terminal used for IoT services.

The base station 20 performs radio communication with the communication terminal 30. The base station 20 may be an evolved Node B (eNB) defined in the 3rd Generation Partnership Project (3GPP) as a base station that supports Long Term Evolution (LTE) as a radio communication system. Alternatively, the base station 20 may be a NodeB defined in the 3GPP as a base station that supports a radio communication system referred to as 3G.

The control apparatus 10 is a node device arranged in a mobile network, particularly in a core network. The control apparatus 10 is a node device that relays or processes control information in the mobile network. Control information may be referred to as, for example, Control (C-) Plane data, a C-Plane message, or the like. The control apparatus 10 may be, for example, an MME, a Serving General Packet Radio Service (GPRS) Support Node (SGSN), or the like defined in the 3GPP.

Next, a configuration example of the control apparatus 10 is described below. The control apparatus 10 includes a calculator 11 and a transceiver 12. The calculator 11 and the transceiver 12 may each be software or a module the processing of which is performed by a processor executing programs stored in a memory. Alternatively, the calculator 11 and the transceiver 12 may each be hardware such as a chip or a circuit. The transceiver may be a transmitter and a receiver.

The calculator 11 calculates, using a first identifier allocated to the communication terminal 30, a first timing at which paging for the communication terminal 30 is performed. The calculator 11 further calculates, using a second identifier allocated to the communication terminal 30, a second timing at which paging for the communication terminal 30 is performed. In addition, the calculator 11 may determine which timing precedes the other by comparing these calculation results. Paging is caused due to, for example, transaction originating a network.

The first identifier and the second identifier are Temporary IDs temporality allocated to the communication terminal 30 and updated or changed periodically or at any timing. The second identifier may be, for example, an identifier updated from the first identifier. The first identifier and the second identifier may each be, specifically, an S-TMSI containing an M-TMSI contained in a GUTI.

The first timing is determined, for example, based on the first identifier. Specifically, the first timing may be calculated by applying the first identifier to a predetermined expression. The second timing is determined based on the second identifier similarly to the first timing.

When the first timing precedes the second timing, the transceiver 12 transmits, according to the first timing, a Paging message containing the first identifier to the base station 20. On the other hand, when the second timing precedes the first timing, the transceiver 12 transmits, according to the second timing, a Paging message containing the second identifier to the base station 20. That is, the transceiver 12 transmits, to the base station 20, a Paging message containing the identifier corresponding to the first timing or the second timing which precedes the other.

When receiving the Paging message containing the first identifier, the base station 20 performs paging for the communication terminal 30 at the first timing. On the other hand, when receiving the Paging message containing the second identifier, the base station 20 performs paging for the communication terminal 30 at the second timing.

As described above, when the control apparatus 10 holds two identifiers regarding the communication terminal 30, it is possible for the control apparatus 10 to calculate, using the identifiers, timings at which paging for the communication terminal 30 can be performed. In addition, it is possible for the control apparatus 10 to transmit a Paging message containing an identifier to be used at an earlier timing to the base station 20.

For this reason, by holding two identifiers, it is possible for the control apparatus 10 according to the first embodiment to perform paging at an earlier timing compared with the case in which the order of paging is predetermined.

Second Embodiment

Figure 2:
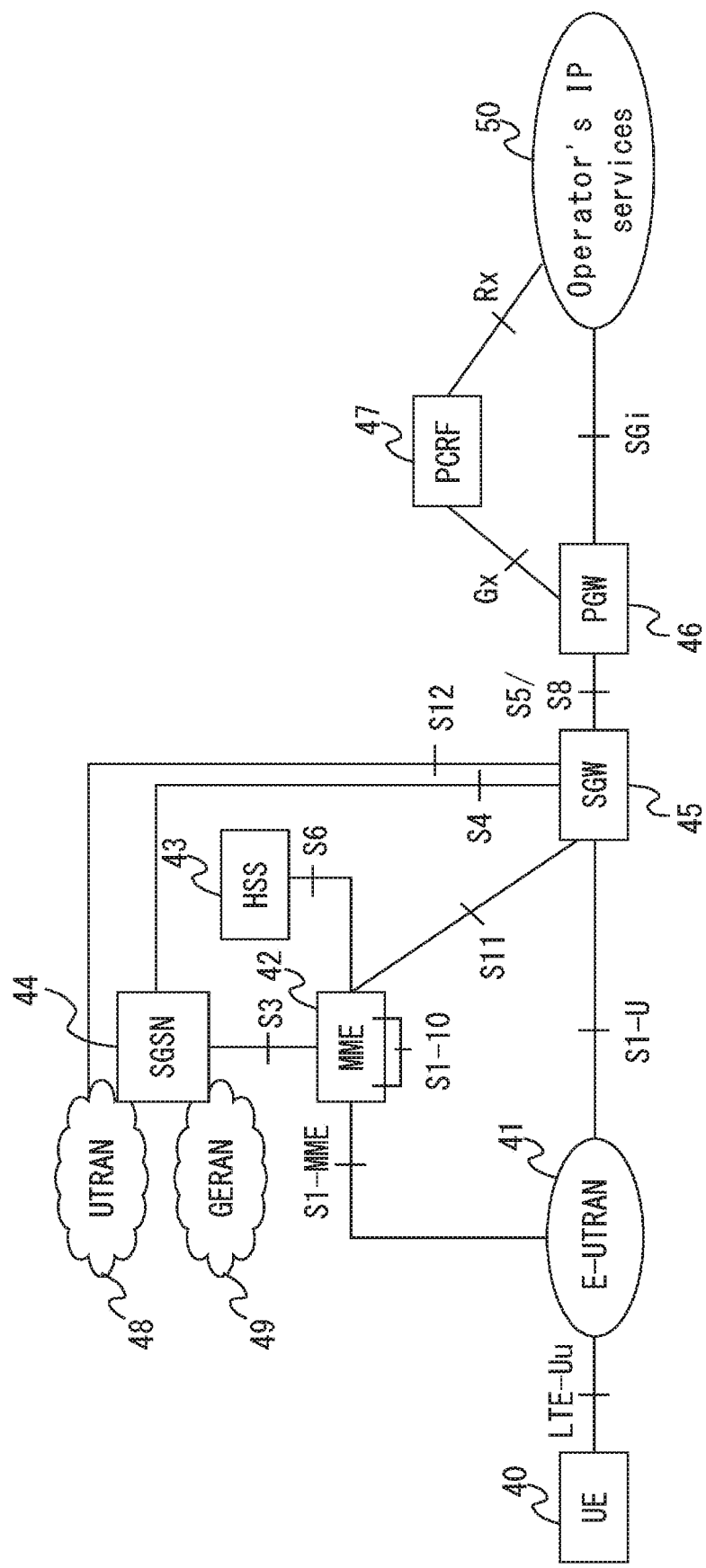
FIG. 2 is a configuration diagram of a communication system according to a second embodiment.

Next, with reference to FIG. 2, a configuration example of a communication system according to a second embodiment of the present disclosure is described. The communication system in FIG. 2 supports LTE as a radio communication system and includes a communication system defined as an Evolved Packet System (EPS) in the 3GPP. Note that, FIG. 2 is based on FIG. 4.2.1-1 in TS 23.401 V 13.5.0.

The communication system in FIG. 2 includes a UE 40, an Evolved-Universal Terrestrial Radio Access Network (E-UTRAN) 41, an MME 42, a Home Subscriber Server (HSS) 43, an SGSN 44, a Serving Gateway (SGW) 45, a Packet Data Network Gateway (PGW) 46, a Policy and Charging Rules Function (PCRF) entity 47 (hereinafter, referred to as a PCRF 47), a UTRAN 48, a Global System for Mobile communications (GSM) (registered trademark) Enhanced Data Rates for Global Evolution (EDGE) Radio Access Network (GERAN) 49, and Operator's IP Services 50.

The MME 42 and the SGSN 44 correspond to the control apparatus 10 in FIG. 1. The E-UTRAN 41 corresponds to the base station 20 in FIG. 1. The UE 40 corresponds to the communication terminal 30 in FIG. 1.

The term "UE" is used as a general term of communication terminals in the 3GPP. The term UE may be replaced with, for example, a Mobile Station (MS). The E-UTRAN 41 is a Radio Access Network (RAN) using LTE as a radio access system and includes an eNB. The UTRAN 48 is a RAN using a 3G radio system as a radio access system and includes a NodeB. The GERAN 49 is a RAN using a 2G radio system as a radio access system.

The MME 42 and the SGSN 44 are nodes that perform mobility management and session management regarding the UE 40. The HSS 43 is a node that manages subscriber information regarding the UE 40. The subscriber information includes information regarding services used by the UE 40. The SGW 45 and the PGW 46 are gateways that relay data transmitted between the UE 40 and the Operator's IP Services 50. The Operator's IP Services 50 may be, for example, server devices or server device groups managed by operators or the like providing services with the UE 40. The PCRF 47 is a node that manages policies, accounting rules, and the like.

Between the UE 40 and the E-UTRAN 41, an LTE-Uu reference point is defined. Between the E-UTRAN 41 and the MME 42, an S1-MME reference point is defined. Between the MME 42 and the HSS 43, an S6 reference point is defined. Between the MME 42 and the SGSN 44, an S3 reference point is defined. Between the E-UTRAN 41 and the SGW 45, an S1-U reference point is defined. Between the MME 42 and the SGW 45, an S11 reference point is defined. Between the SGSN 44 and the SGW 45, an S4 reference point is defined. Between the SGW 45 and the UTRAN 48, an S12 reference point is defined. Between the SGW 45 and the PGW 46, an S5/S8 reference point is defined. Between the PGW 46 and the PCRF 47, a Gx reference point is defined. Between the PGW 46 and the Operator's IP Services 50, an SGi reference point is defined. Between the PCRF 47 and the Operator's IP Services 50, an Rx reference point is defined. Between the MME 42 and another MME, an S1-10 reference point is defined.

Figure 3:
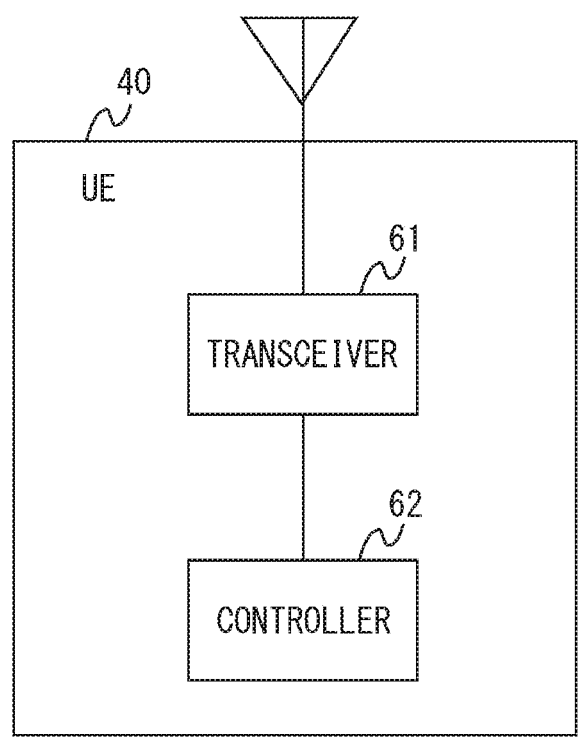
FIG. 3 is a configuration diagram of a UE according to the second embodiment.

Next, with reference to FIG. 3, a configuration example of the UE 40 according to the second embodiment is described. The UE 40 includes a transceiver 61 and a controller 62. The transceiver 61 and the controller 62 may each be software or a module the processing of which is performed by a processor executing programs stored in a memory. Alternatively, the transceiver 61 and the controller 62 may each be hardware such as a chip or a circuit. The transceiver may be a transmitter and a receiver.

The controller 62 performs an eDRX function. For example, the controller 62 monitors, via the transceiver 61, whether paging for the UE 40 is performed, according to an eDRX cycle. When determining that paging for the UE 40 is performed, the controller 62 transmits a response message to the E-UTRAN 41 (eNB) via the transceiver 61. The transceiver 61 receives a GUTI from the MME 42 via the E-UTRAN 41 (eNB). The controller 62 calculates a timing for monitoring paging using an S-TMSI containing an M-TMSI contained in the GUTI.

When the GUTI is updated in the MME 42, the controller 62 receives a new GUTI after the update from the MME 42 via the transceiver 61. The controller 62 calculates a new monitoring timing using a new S-TMSI containing an M-TMSI contained in the received GUTI. The monitoring timing is determined based on an S-TMSI, and the monitoring timing is also changed as the S-TMSI is updated.

Figure 4:
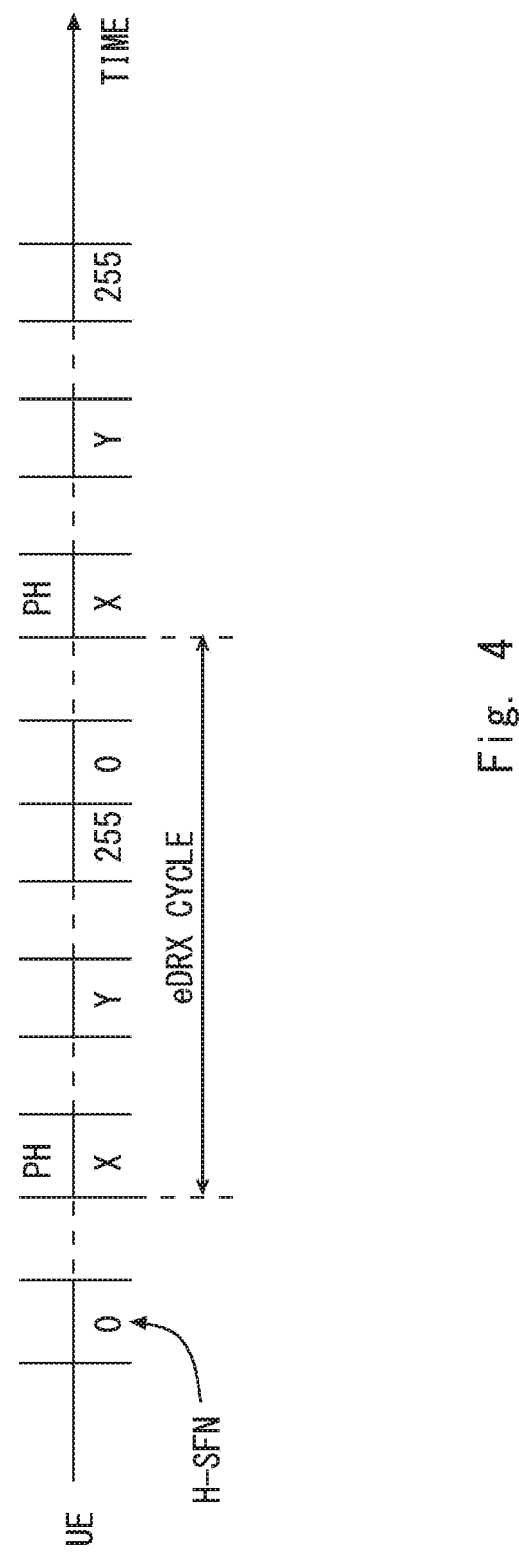
FIG. 4 is a diagram explaining an eDRX function performed by the UE according to the second embodiment.

Next, with reference to FIG. 4, the eDRX function performed by the UE 40 is described. In FIG. 4, the abscissa is a time axis. The time axis is represented using the Hyper-System Frame Number (H-SFN). In the H-SFN, 256 frames from 0 to 255 are defined, and values from 0 to 255 are repeatedly used. The length of one H-SFN is defined as 10.24 seconds. That is, the time from H-SFN #0 to H-SFN #255 is about 43 minutes. In FIG. 4, the length of 256 H-SFNs is defined as an eDRX cycle. In addition, X and Y each indicate any value of the H-SFN. Here, it is assumed that Y is greater than X. FIG. 4 exemplifies that the number of frames is 256, but the number of frames is not limited to 256. For example, the maximum number of frames may be expanded to 1024, and any number of frames equal to or less than the maximum number of frames may be used.

A Paging Hyperframe (PH) is a H-SFN at a timing when the UE 40 monitors paging. FIG. 4 shows that the UE 40 monitors paging at the H-SFN #X timing. H-SFN #X indicates the X-th H-SFN. A PH is calculated based on an S-TMSI. The H-SFN shown in FIG. 4 is synchronized with the eNB included in the E-UTRAN 41 and the MME 42. That is, both of the eNB and the MME 42 calculate the respective PHs using the S-TMSI containing the M-TMSI contained in the GUTI allocated to the UE 40. The first timing and the second timing described in the first embodiment correspond to the calculated PHs.

Figure 5:
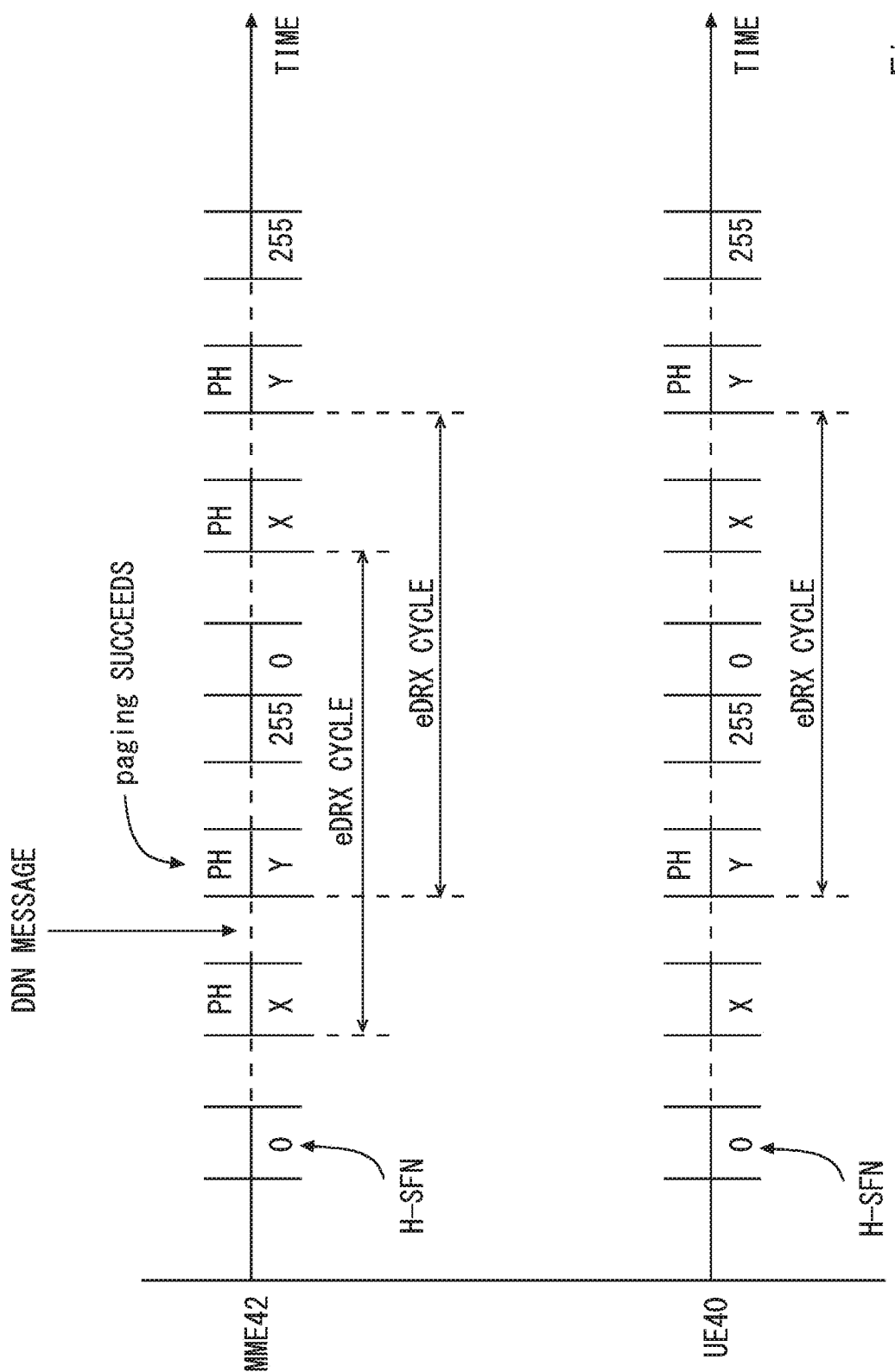
FIG. 5 is a diagram explaining an outline of a paging process according to the second embodiment.

Next, an outline of a paging process according to the second embodiment is described with reference to FIG. 5. FIG. 5 shows that the UE 40 and the MME 42 hold the synchronized H-SFN. In FIG. 5, the H-SFN held by the UE 40 has the same timings as those of the H-SFN held by the MME 42, but may be shifted by a predetermined time from the H-SFN held by the MME 42.

Here, it is assumed that H-SFN #X is the PH calculated based on an old S-TMSI. It is further assumed that H-SFN #Y is the PH calculated based on a new S-TMSI. In the paging process shown in FIG. 5, the MME 42 transmits a Paging message according to the PH calculated using the old S-TMSI and the PH calculated using the new S-TMSI. The PH in the UE 40 is H-SFN #Y. That is, the UE 40 is assumed to hold the new S-TMSI.

For example, it is assumed that the MME 42 receives, at a timing between the H-SFN #X timing and the H-SFN #Y timing, a Downlink Data Notification (DDN) message indicating that downlink data addressed to the UE 40 is generated. In this case, the MME 42 determines that, among PHs in which paging is performed, the earliest PH is H-SFN #Y. Thus, the MME 42 transmits a Paging message containing the new S-TMSI to the eNB, which is the E-UTRAN 41, in time for the H-SFN #Y timing. The eNB performs paging at the H-SFN #Y timing.

The UE 40 monitors paging at the H-SFN #Y timing. Thus, the UE 40 recognizes that paging for the UE 40 has been performed at the H-SFN #Y timing. That is, paging succeeds at the H-SFN #Y timing. It has been described that the MME 42 receives a DDN message as a trigger for causing paging in FIG. 5, but the trigger for causing paging is not limited thereto. The MME 42 may transmit a Paging message based on another trigger for causing paging generated while the eDRX function is used.

Figure 6:
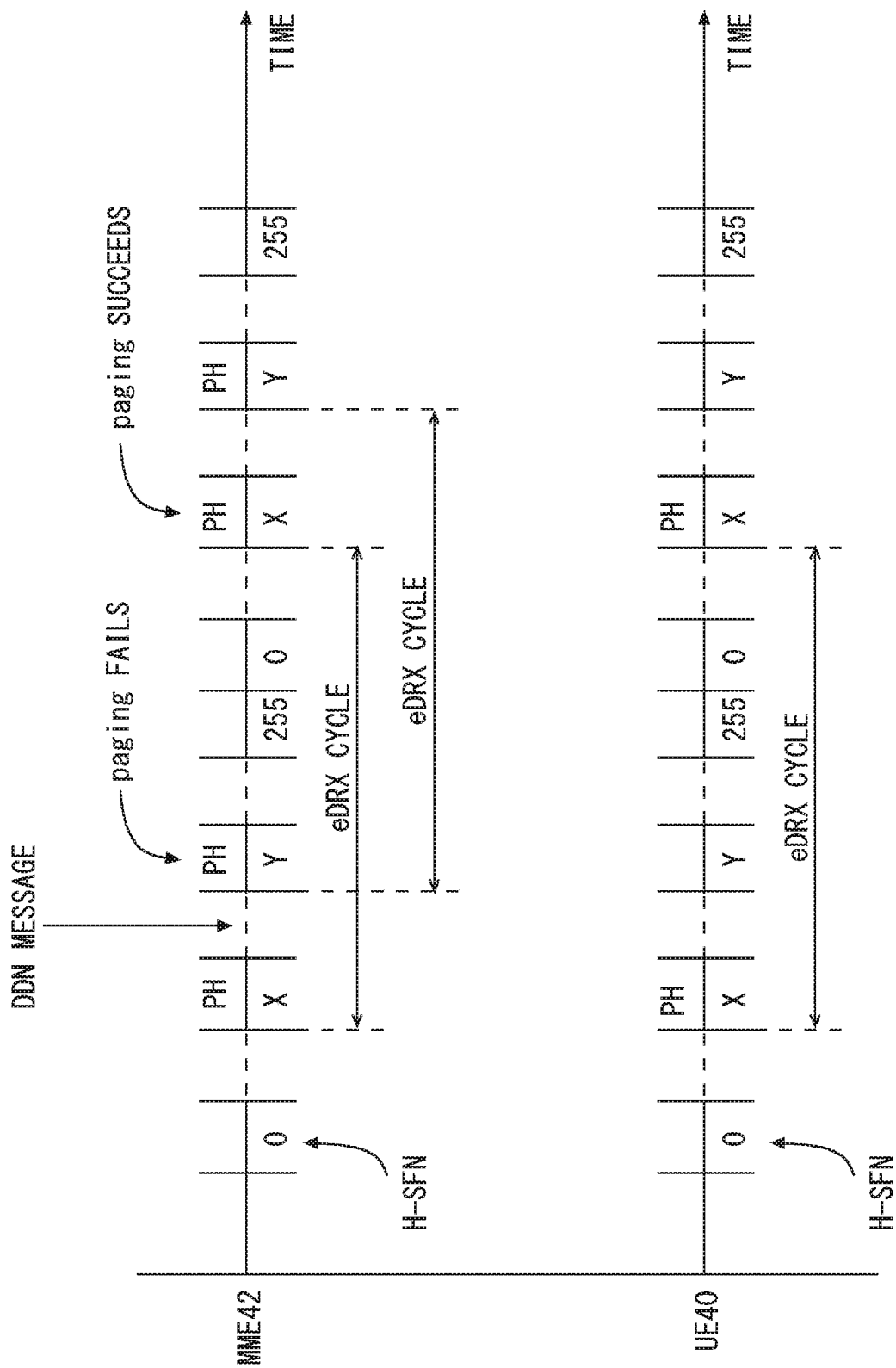
FIG. 6 is a diagram explaining an outline of a paging process according to the second embodiment.

Next, with reference to FIG. 6, an outline of a different paging process from that in FIG. 5 is described. In FIG. 6, the PH in the UE 40 is H-SFN #X. That is, the UE 40 is assumed to hold the old S-TMSI.

For example, it is assumed that the MME 42 receives, at a timing between the H-SFN #X timing and the H-SFN #Y timing, a Downlink Data Notification (DDN) message indicating that downlink data addressed to the UE 40 is generated. In this case, the MME 42 determines that the nearest PH in which paging is to be performed is H-SFN #Y. Thus, the MME 42 transmits a Paging message containing the new S-TMSI to the eNB, which is the E-UTRAN 41, in time for the H-SFN #Y timing. The eNB performs paging at the H-SFN #Y timing.

The UE 40 monitors paging at the H-SFN #X timing. That is, the UE 40 does not monitor paging at the H-SFN #Y timing, and cannot recognize the paging for the UE 40. As the result, the paging fails at the H-SFN #Y timing. In this case, the MME 42 transmits a Paging message containing the old S-TMSI to the eNB in time for the H-SFN #X timing, which is the next PH. The eNB performs paging at the H-SFN #X timing.

Since the UE 40 monitors paging at the H-SFN #X timing, the paging succeeds. Note that, a period in which a UE monitors paging is referred to as a Paging Time Window.

As shown in FIGS. 5 and 6, the MME 42 transmits a Paging message to the eNB in time for the nearest PH after the reception of the DDN message. Although the paging in the nearest PH fails, paging in the next PH succeeds.

Figure 7:
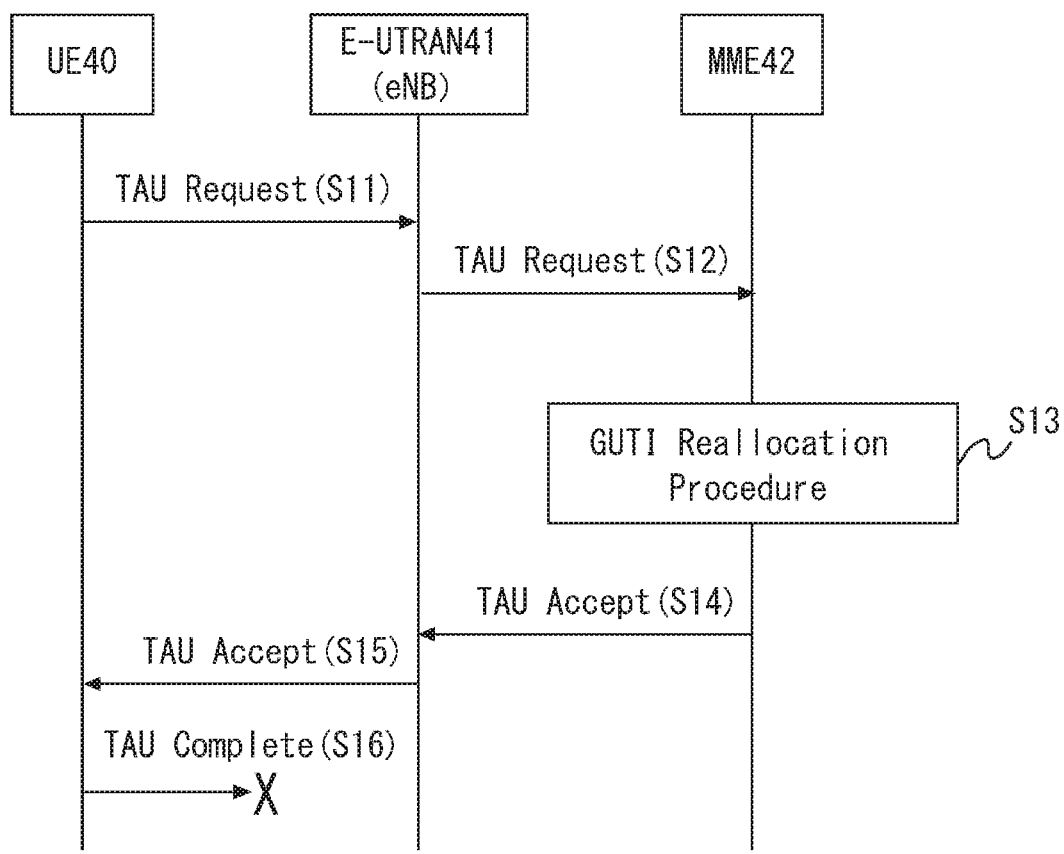
FIG. 7 is a diagram showing a sequence when an MME according to the second embodiment cannot recognize that a UE holds a new GUTI.

Next, with reference to FIGS. 7 to 10, sequence examples when the MME 42 cannot recognize whether the UE 40 holds the new GUTI are described. The sequence of FIG. 7 is first described. First, the UE 40 transmits a TAU Request message to the eNB in the E-UTRAN 41 (S11). The UE 40 may transmit a TAU Request message when TA representing a tracking area is changed or may transit a TAU Request message at a predetermined timing.

Then, the eNB transfers, to the MME 42, the TAU Request message transmitted from the UE 40 (S12). Then, the MME 42 performs a GUTI Reallocation Procedure (S13). Specifically, the MME 42 updates the GUTI currently allocated to the UE 40 (old GUTI) to generate a new GUTI (new GUTI). For example, the MME 42 updates the M-TMSI contained in the old GUTI.

Then, the MME 42 transmits a TAU Accept message containing the new GUTI to the eNB (S14). The TAU procedure performed during steps S12 to S14 is a known procedure, and its detailed description is omitted. Then, the eNB transfers, to the UE 40, the TAU Accept message transmitted from the MME 42 (S15).

Then, the UE 40 transmits a TAU Complete message as a response to the TAU Accept message to the eNB (S16). Here, the TAU Complete message cannot reach the eNB in some cases due to poor communication quality of radio sections between the UE 40 and eNB. In such a case, the MME 42 cannot receive the TAU Complete message transmitted from the UE 40. For this reason, the MME 42 cannot determine whether the UE 40 is notified of the new GUTI, and temporarily holds both of the old GUTI and the new GUTI. Note that, the UE 40 has received the new GUTI with the TAU Accept message in the example of FIG. 7.

Figure 8:
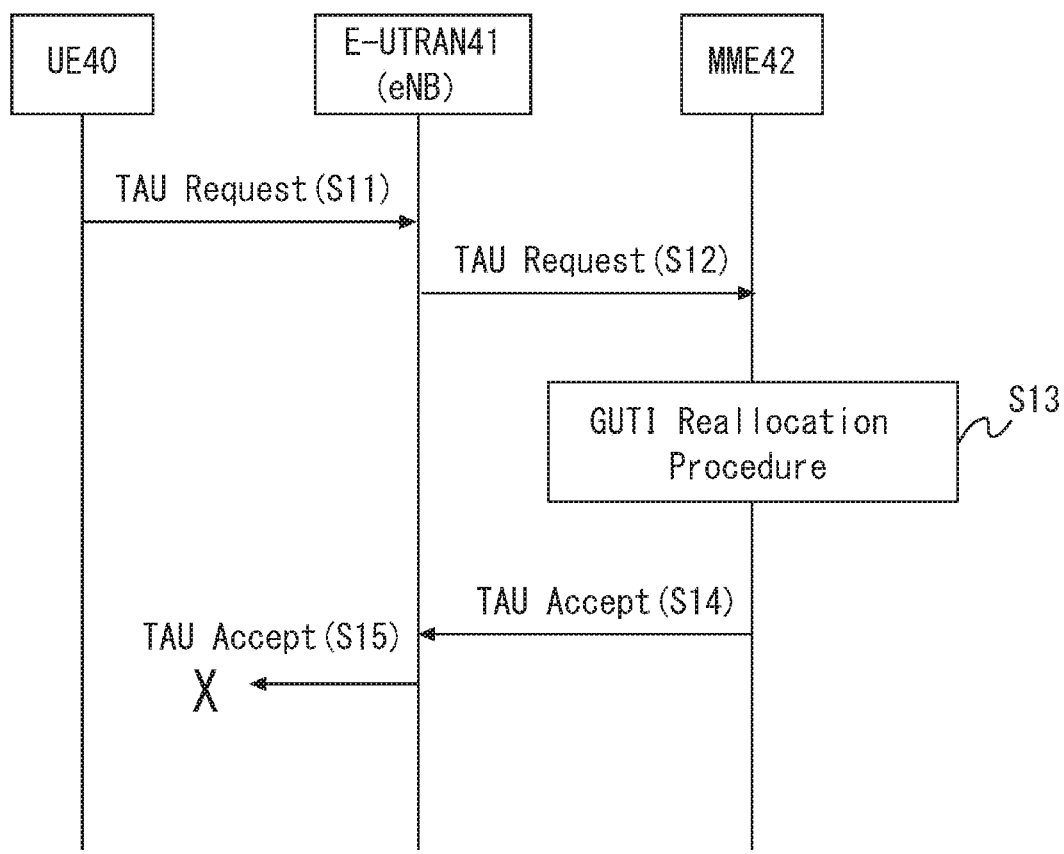
FIG. 8 is a diagram showing a sequence when the MME according to the second embodiment cannot recognize that the UE holds a new GUTI.

Next, the sequence of FIG. 8 is described. Steps S11 to S14 in FIG. 8 are similar to steps S11 to S14 in FIG. 7, and the detailed description thereof is omitted. In FIG. 8, it is assumed that the TAU Accept message transferred by the eNB to the UE 40 in step S15 does not reach the UE 40. In this case, the UE 40 does not receive the TAU Accept message and cannot respond to the TAU Accept message. As the result, the MME 42 cannot receive a TAU Complete message which is a response to the TAU Accept message. In this case, the MME 42 cannot determine whether the UE 40 is notified of the new GUTI either and temporarily holds both of the old GUTI and the new GUTI. Note that, the UE 40 has not received the new GUTI and holds the old GUTI before the update in this example.

Figure 9:
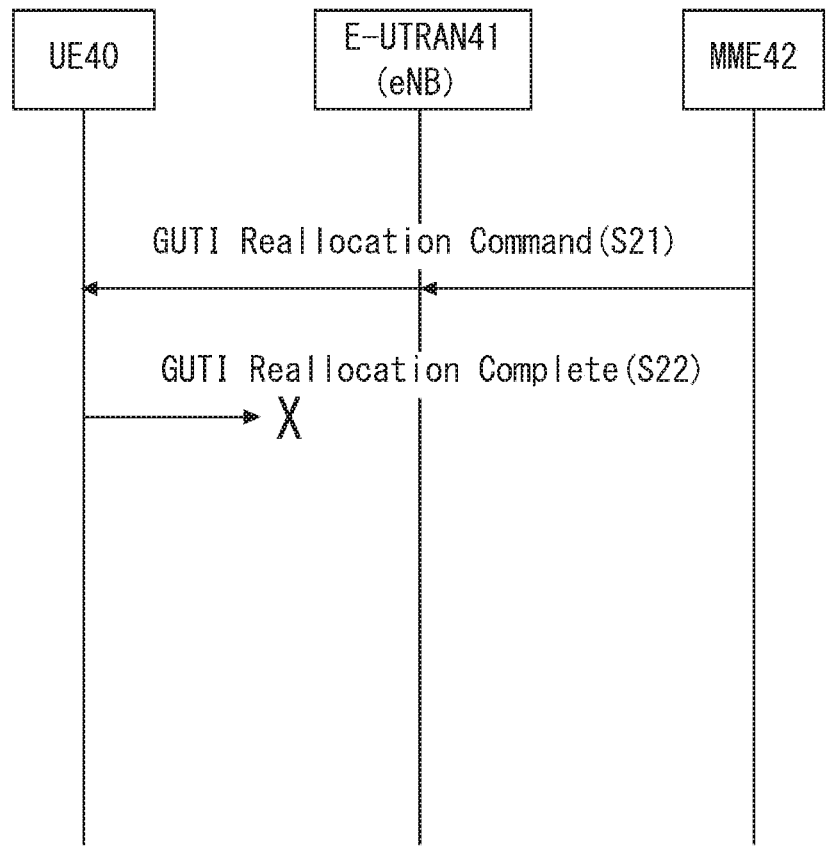
FIG. 9 is a diagram showing a sequence when the MME according to the second embodiment cannot recognize that the UE holds a new GUTI.

Next, the sequence of FIG. 9 is described. FIG. 9 shows that the MME 42 transmits a GUTI (new GUTI) updated at an arbitrary timing to the UE 40. The MME 42 transmits a GUTI Reallocation Command message to the UE 40 via the eNB at an arbitrary timing (S21). The GUTI Reallocation Command message contains the new GUTI. Then, the UE 40 transmits, to the eNB, a GUTI Reallocation Complete message as a response to the GUTI Reallocation Command message (S22). However, the GUTI Reallocation Complete message cannot reach the eNB in some cases due to poor communication quality of radio sections between the eNB and the UE 40. In such a case, the MME 42 cannot receive the GUTI Reallocation Complete message transmitted from the UE 40. In this case, the MME 42 holds both old and new GUTIs similarly to the case in FIG. 7 or 8. Note that, the UE 40 has received the new GUTI in this example.

Figure 10:
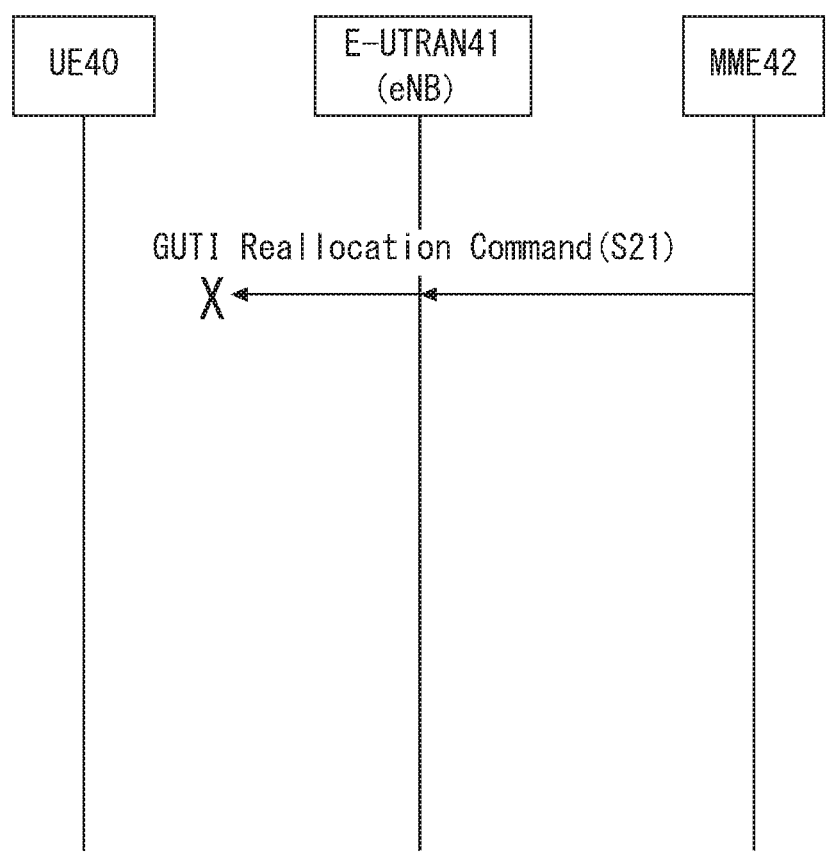
FIG. 10 is a diagram showing a sequence when the MME according to the second embodiment cannot recognize that the UE holds a new GUTI.

Next, the sequence of FIG. 10 is described. The MME 42 transmits a GUTI Reallocation Command message to the UE 40 via the eNB at an arbitrary timing (S21). The GUTI Reallocation Command message contains the new GUTI. However, the GUTI Reallocation Command message cannot reach the eNB in some cases due to poor communication quality of radio sections between the eNB and the UE 40. In such a case, the MME 42 cannot receive a GUTI Reallocation Complete message, which is a response to the GUTI Reallocation Command message. In this case, the MME 42 holds both old and new GUTIs similarly to the case of FIG. 7 or 8. Note that, the UE 40 has not received the new GUTI and holds the old GUTI before the update in this example.

Figure 11:
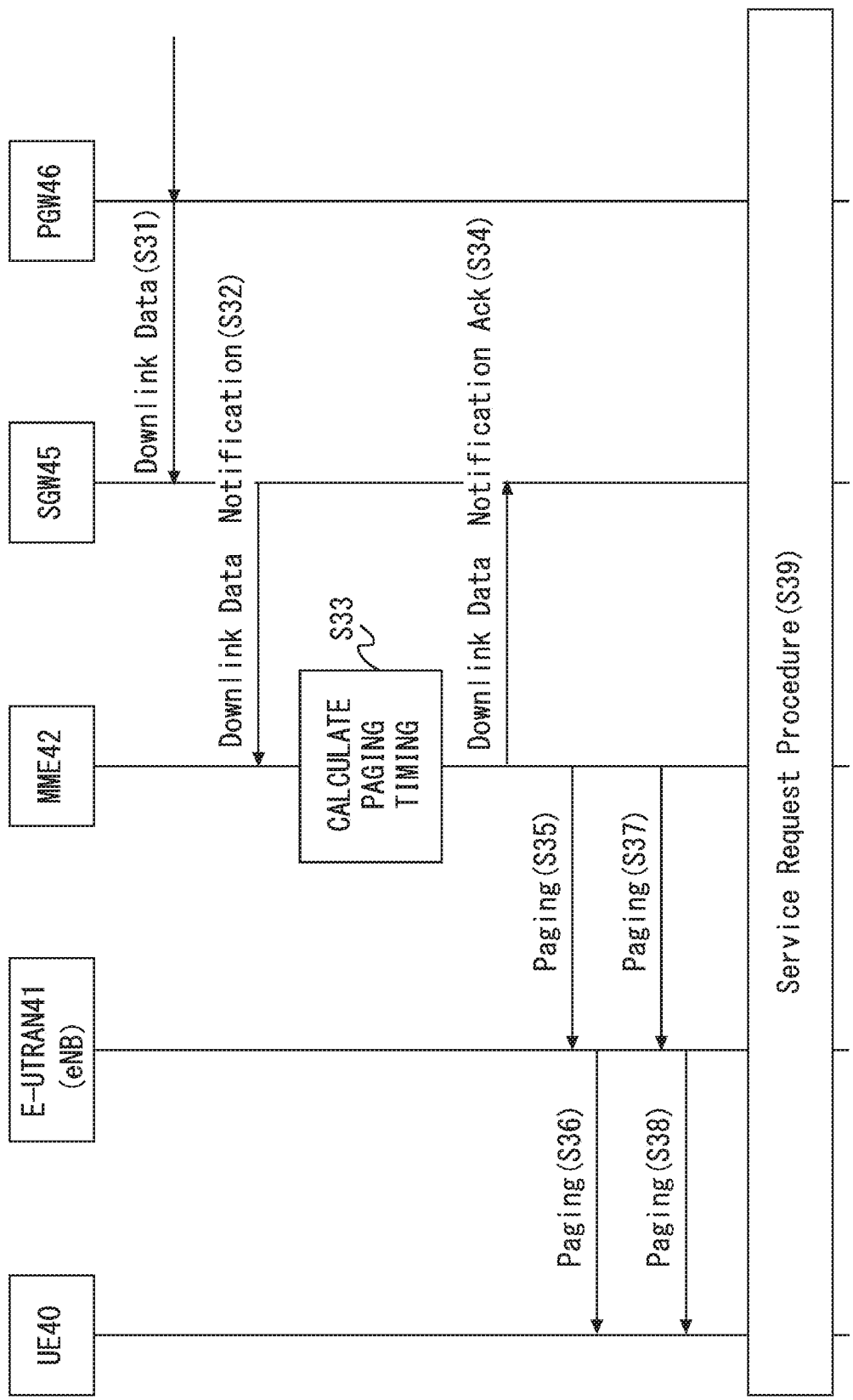
FIG. 11 is a diagram explaining a procedure of a paging process according to the second embodiment.

Next, with reference to FIG. 11, a procedure of a paging process is described. It is assumed that the MME 42 in FIG. 11 has not received, from the UE 40, a response message to the TAU Accept message or the GUTI Reallocation Command due to either case in FIG. 8 or 10.

First, when receiving Downlink Data addressed to the UE 40 from the Operator's IP Services 50 or the like, the PGW 46 transmits the Downlink Data to the SGW 45 (S31). Then, the SGW 45 transmits a DDN message to the MME 42 in order to notify the MME 42 that the Downlink Data addressed to the UE 40 has been received (S32).

Here, since the MME 42 has not received a response message from the UE 40 as described above, the MME 42 is not certain whether the new GUTI reaches the UE 40. Thus, the MME 42 holds both of the old GUTI and the new GUTI. Thus, the MME 42 calculates a PH using the old S-TMSI containing the M-TMSI contained in the old GUTI and further calculates a PH using the new S-TMSI containing the M-TMSI contained in the new GUTI (S33). The MME 42 may further compare these calculation results to determine which result has an earlier paging timing. Alternatively, the MME 42 may calculate which PH regarding the old S-TMSI or the new S-TMSI has the next monitoring timing according to the eDRX cycle.

Then, the MME 42 transmits a DDN Acknowledge (Ack) message to the SGW 45 as a response to the DDN message (S34)

For example, it is assumed that the MME 42 determines, as the result of the calculation in step S33, that the PH calculated using the new S-TMSI precedes the PH calculated using the old S-TMSI. In other words, the MME 42 compares these paging timings to determine the earlier (first) paging timing. In this case, the MME 42 transmits, to the eNB, a Paging message in which the new S-TMSI is set in time for the PH calculated using the new S-TMSI (S35). Then, when receiving the Paging message from the MME 42, the eNB performs paging for the UE 40 in the PH (at the paging timing) calculated using the new S-TMSI (S36).

Here, when the UE 40 holds the old S-TMSI as in FIG. 8 or 10, the UE 40 does not monitor paging in the H-SFN calculated using the new S-TMSI. Thus, the paging performed at the timing in step S36 fails. As the result, the MME 42 does not receive a response regarding the Paging message transmitted in step S35. In this case, the MME 42 transmits, to the eNB, a Paging message in which the old S-TMSI is set in time for the PH calculated using the old S-TMSI (S37). Then, when receiving the Paging message from the MME 42, the eNB performs paging for the UE 40 in the PH (at the paging timing) calculated using the old S-TMSI (S38).

The UE 40 monitors paging in the PH calculated using the old S-TMSI. Thus, when paging is performed at the timing in step S38, the UE 40 performs an Service Request Procedure (S39). The MME 42 receives, in the Service Request Procedure, a response to the Paging message transmitted in step S37.

The MME 42 sets a Downlink (DL) Buffering Duration time in the DDN Ack message transmitted at the timing in step S34 to designate a period in which the SGW 45 buffers the Downlink Data. When the MME 42 sets the Buffering Duration time while holding the old GUTI and the new GUTI, the MME 42 may notify the SGW 45 of a sufficient period in which the two paging processes of the paging process using the new S-TMSI (S35/S36) and the paging process using the old S-TMSI (S37/S38), which are to be performed based on the calculation in step S33, as a buffer period.

Figure 12:
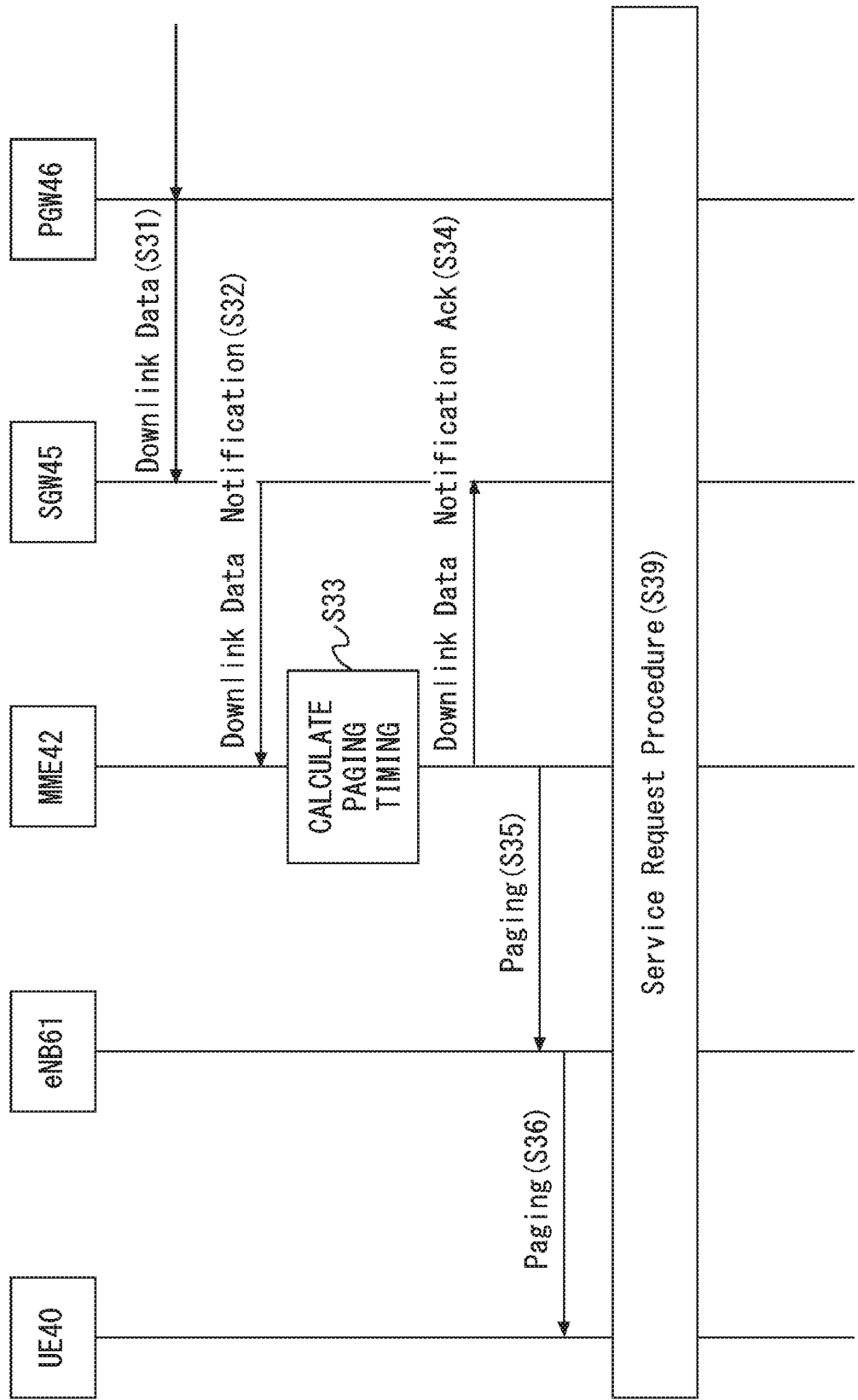
FIG. 12 is a diagram explaining a procedure of a paging process according to the second embodiment.

Next, with reference to FIG. 12, a different procedure of a paging process from that in FIG. 11 is described. The MME 42 in FIG. 12 has not received a response message to the TAU Accept message or the GUTI Reallocation Command from the UE 40 due to either case in FIG. 7 or 9. In addition, steps from S31 to S36 in FIG. 12 are similar to steps from S31 to S36 in FIG. 11, and the detailed description thereof is omitted.

Here, when the UE 40 holds the new S-TMSI as in the case in FIG. 7 or 9, the UE 40 monitors paging in the PH calculated using the new S-TMSI. Thus, when paging is performed in step S36, the UE 40 performs a Service Request Procedure (S39).

Since the Service Request Procedure (S39) is performed, the ME 42 does not transmit a Paging message in time for the PH calculated using the old S-TMSI. Thus, paging regarding the old S-TMSI is not performed.

As described above, it is possible for the MME 42 to transmit a Paging message to the eNB in time for the earlier PH after the reception of a DDN message. In other words, regardless of whether the earlier PH after the reception of a DDN message is calculated using the old S-TMSI or the new S-TMSI, it is possible for the MME 42 to transmit a Paging message to the eNB in time for the earlier PH.

For this reason, when the MME 42 holds the old S-TMSI and the new S-TMSI, the possibility that paging succeeds in the earlier PH after the MME 42 receives a DDN message is increased compared with the case in which the first PH for performing paging is predetermined based on the S-TMSIs.

Figure 13:
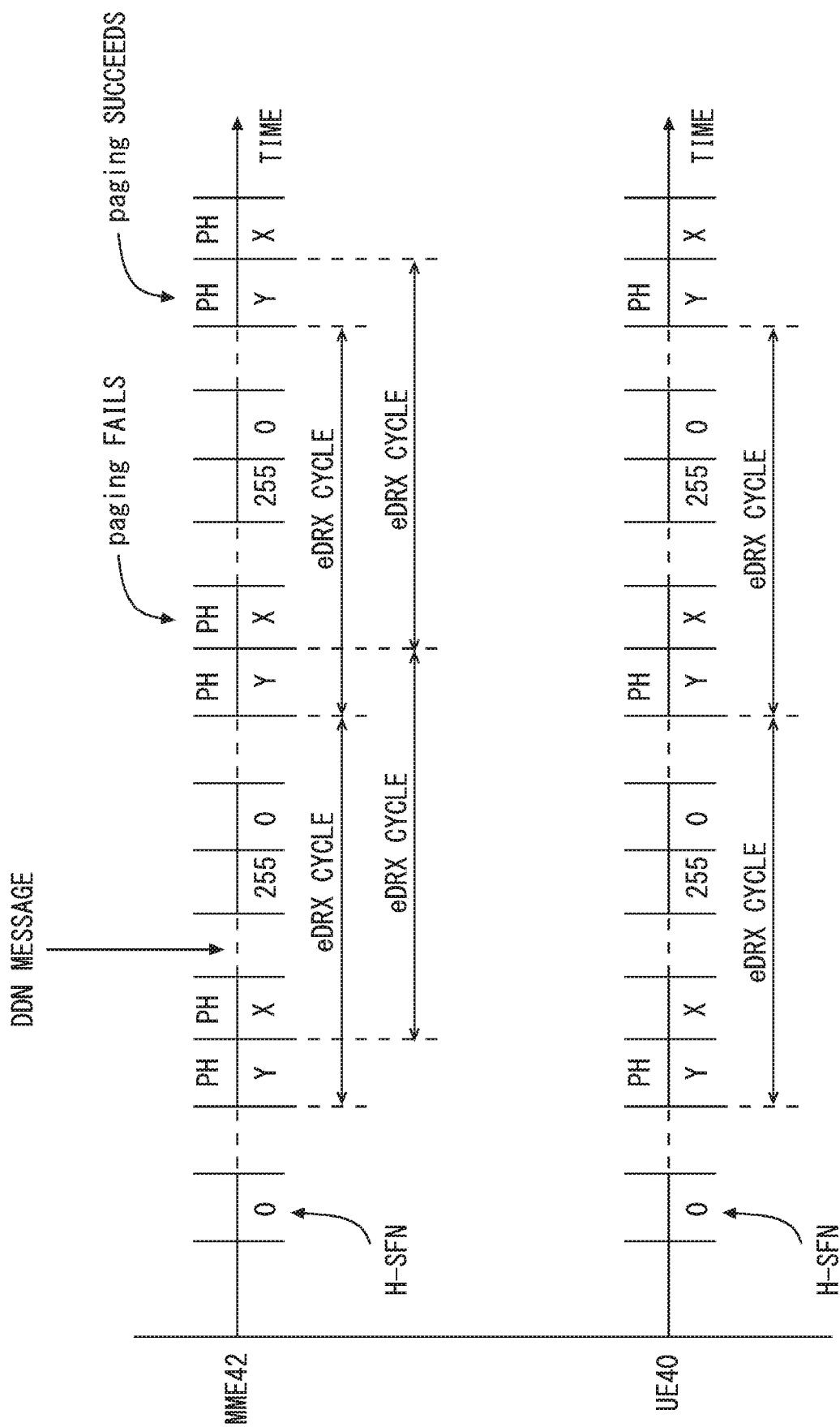
FIG. 13 is a diagram explaining a procedure of a paging process according to the second embodiment.

With reference to FIG. 13, the more remarkable effect when the MME 42 holds the old S-TMSI and the new S-TMSI than the case in which the first PH for performing paging is predetermined based on the S-TMSIs is described.

In FIG. 13, it is assumed that paging using the old S-TMSI is performed first, and paging using the new S-TMSI is performed when there is no response to the paging using the old S-TMSI.

It is assumed that H-SFN #X is a PH calculated based on the old S-TMSI. In addition, it is assumed that H-SFN #Y is a PH calculated based on the new S-TMSI. It is further assumed that the UE 40 holds the new S-TMSI, and H-SFN #Y is a PH.

Here, when receiving a DDN message immediately after the H-SFN #X timing, the MME 42 transmits a Paging message to the eNB in time for the next H-SFN #X timing. When an eDRX cycle is about 43 minutes, paging regarding the old S-TMSI is performed in about 43 minutes after the MME 42 receives the DDN message. However, since the UE 40 holds the new S-TMSI, paging regarding the old S-TMSI fails. The MME 42 further transmits a Paging message to the eNB in time for the H-SFN #Y timing in about 43 minutes. The paging regarding the new S-TMSI is performed in about 86 minutes after the MME 42 receives the DDN message. At this time, the paging regarding the new S-TMSI succeeds.

On the other hand, when the MME 42 performs the operation according to the second embodiment, the MME 42 can transmit a Paging message in time for the H-SFN #Y timing, which is the earlier paging timing, after the reception of a DDN message. Thus, the paging regarding the new S-TMSI succeeds in about 43 minutes after the MME 42 receives the DDN message.

If the UE 40 holds the old S-TMSI, the paging regarding the old S-TMSI succeeds at H-SFN #X after H-SFN #Y. Thus, when the first PH for performing paging is predetermined based on the S-TMSIs while the MME 42 holds the old S-TMSI and the new S-TMSI, paging can succeed in about 86 minutes after the MME 42 receives a DDN message. However, as long as the MME 42 performs the operation according to the second embodiment, paging succeeds in about 43 minutes in a similar case.

By reducing the time from when the MME 42 receives a DDN message until paging succeeds, it is possible to reduce resource load of the SGW 45 that holds Downlink Data until the paging succeeds.

In the above description, the eNB and the MME 42 have been mainly described. However, a similar process is performed when a Radio Network Controller (RNC) and a Base Station Controller (BSC) are used instead of the eNB, and the SGSN 44 is used instead of the MME 42. In addition, when the RNC, the BSC, and the SGSN 44 are used, a Routing Area Update (RAU) procedure is used instead of the TAU procedure.

Furthermore, the SGW 45 and the PGW 46 may be replaced with a User Plane (UP) gateway device, a 5G gateway device, and the like. The MME 42 and the SGSN 44 may be replaced with a Control Plane (CP) controller, a 5G controller, a 5G management apparatus, and the like. The eNB may be replaced with a New Radio (NR) base station apparatus, an Access Network (AN) base station apparatus, a 5G base station apparatus, or the like.

Third Embodiment

Figure 14:
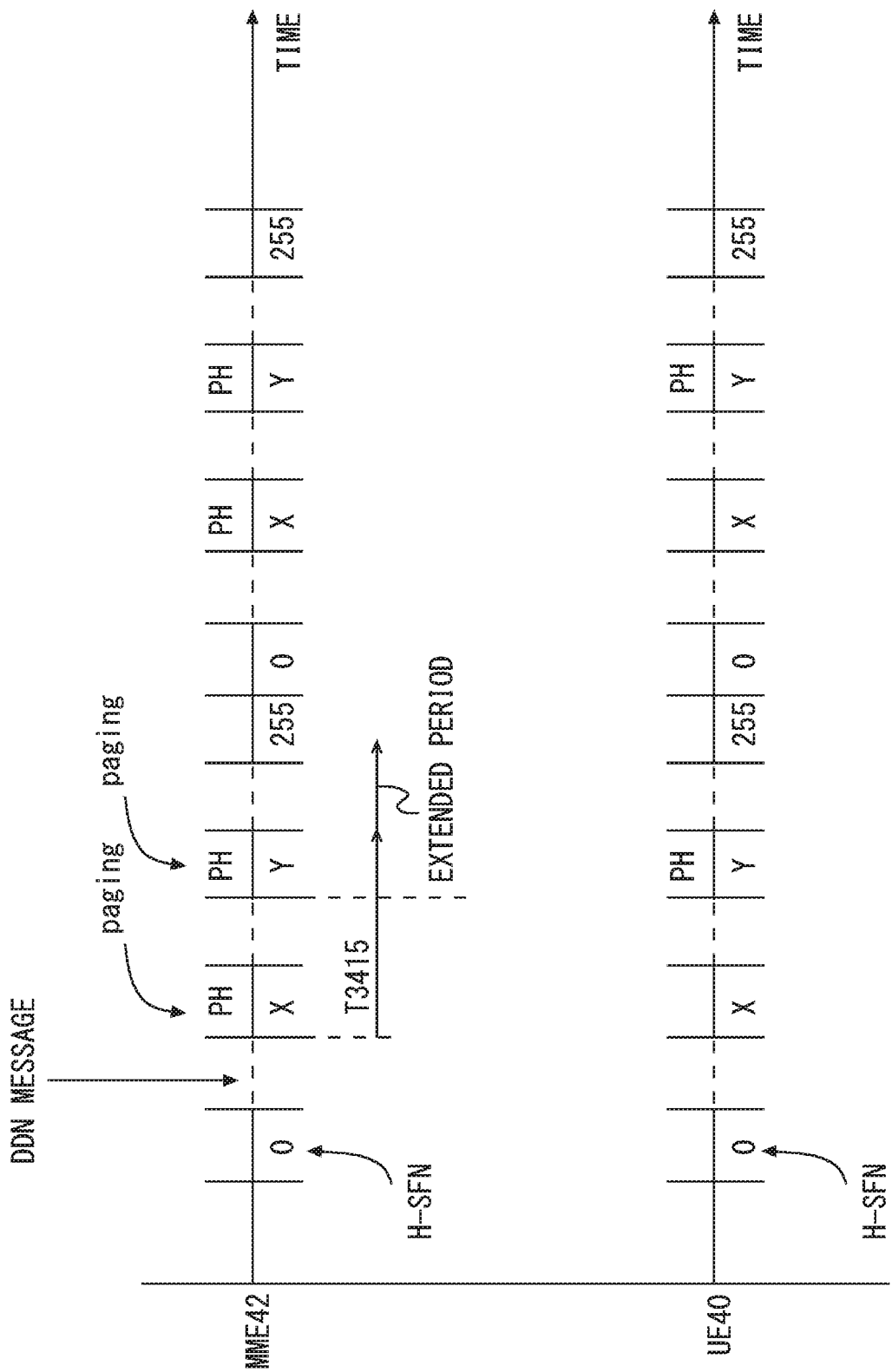
FIG. 14 is a diagram showing operation of a timer according to a third embodiment.

Next, with reference to FIG. 14, operation of an MME 42 according to a third embodiment is described. After receiving a DDN message, the MME 42 transmits a Paging message to an eNB in time for the earliest PH. At this time, the MME 42 starts a timer. The timer started by the MME 42 is defined as T3415 in the 3GPP. FIG. 14 shows that T3415 is started at the timing of starting a PH. However, T3415 may be started, in practical, when the MME 42 transmits a Paging message to the eNB before a PH is started. T3415 operates for a predetermined period. While T3415 operates, paging for the UE 40 is periodically performed. T3415 stops when there is a response to the paging from the UE 40 before the predetermined period expires. That is, while T3415 operates, there is no response to the paging from the UE 40.

When the H-SFN #Y timing comes while paging is being performed at the H-SFN #X timing during the operation of T3415, the MME 42 transmits a Paging message to the eNB in time for the H-SFN #Y timing. That is, when the H-SFN #Y timing comes while paging is being performed at the H-SFN #X timing during the operation of T3415, paging regarding the old S-TMSI and paging regarding the new S-TMSI are performed in parallel.

When receives a response message to either paging, the MME 42 cancels or stops the other paging.

Here, setting of T3415 when paging is performed at the H-SFN #Y timing is described. In the definition in the 3GPP, T3415 is set for each UE. Thus, when T3415 is started in association with paging at the H-SFN #X timing, and paging is performed at the H-SFN #Y timing during the operation of T3415, the expiration time of T3415 may be extended as shown in FIG. 14. Alternatively, when the MME 42 transmits a Paging message to the eNB in time for the H-SFN #Y timing, T3415 may be restarted to be operated anew.

Figure 15:
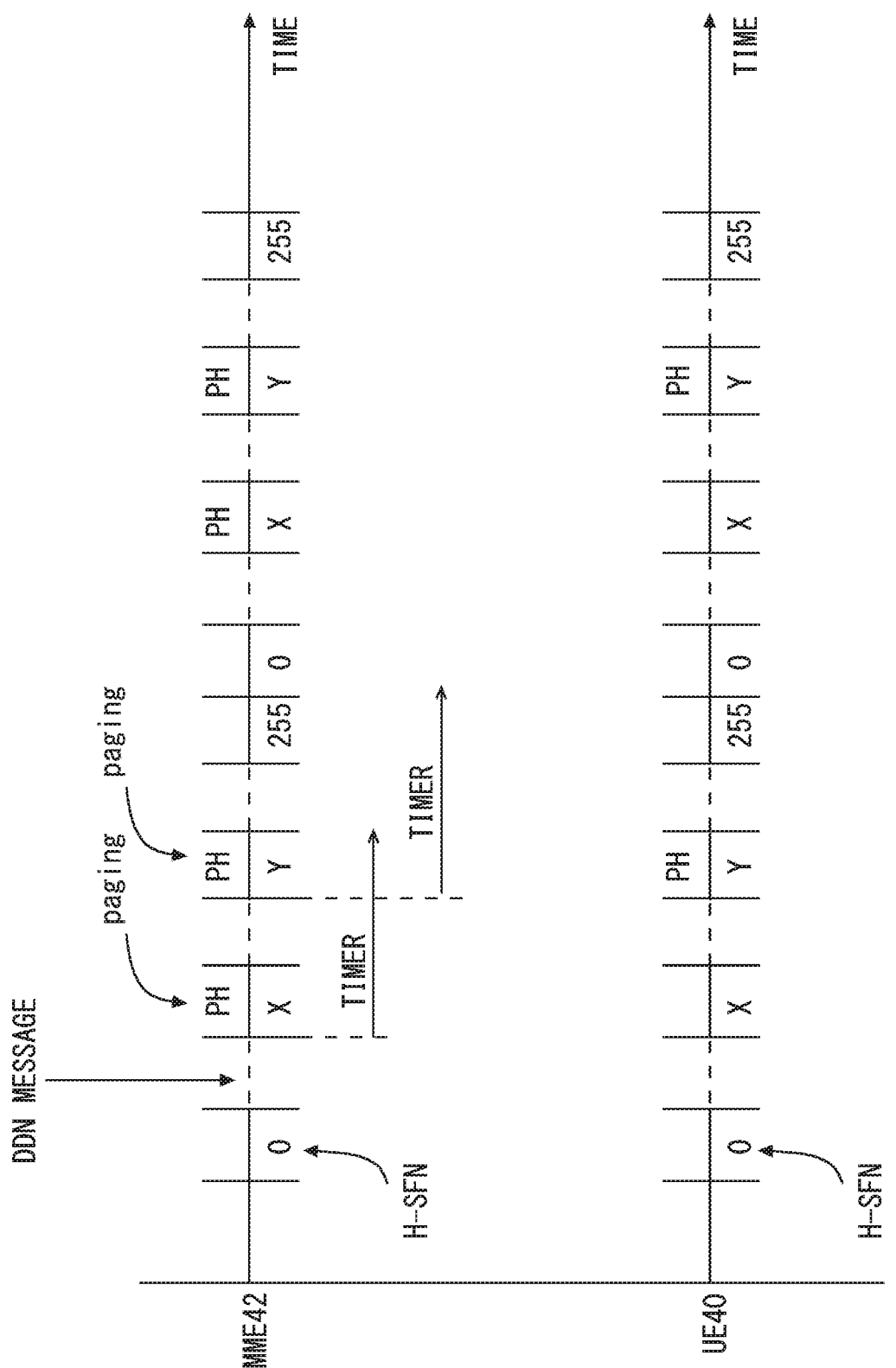
FIG. 15 is a diagram showing operation of the timer according to the third embodiment.

In addition, the MME 42 may set T3415 not for each UE but for each S-TMSI or each GUTI. For example, the MME 42 may manage T3415 regarding paging at the H-SFN #X timing and T3415 regarding paging at the H-SFN #Y timing as shown in FIG. 15.

A network (an MME in specific) calculates the next eDRX using both the old GUTI and the new GUTI and uses the first S-TMSI contained in the GUTI in which the first eDRX timing comes in order to page a UE due to a transaction originated from the network. Thus, when there is no response to attempted Paging, the network uses another S-TMSI included in the other GUTI to page the UE. This second paging may be started although a timer (T3415 or T3315) regarding the first attempted paging is being operated. In addition, an SGSN calculates an eDRX using a Temporary ID corresponding to a GUTI.

Furthermore, the MME may notify, on an S11 interface, an SGW of a DL Buffering Duration parameter in a DDN Ack message so that the SGW buffers DL data for a longer period than the period in which the MME performs the two paging processes. Similarly, the SGSN may notify, on an S4 interface, the SGW of a DL Buffering Duration parameter.

As described above, when the MME 42 holds both of the old S-TMSI and the new S-TMSI during the operation of T3415 regarding paging using one S-TMSI, and a timing for performing paging using the other S-TMSI comes, it is possible for the MME 42 according to the third embodiment to perform both paging processes in parallel.

In the present 3GPP, it is defined that when there is no response to paging using one S-TMSI, paging using the other S-TMSI is performed. Here, while T3415 is operated, the MME can receive a response to paging. Thus, when a timing for performing paging using the other S-TMSI comes during the operation of T3415, the paging using the other S-TMSI is not performed until the period of T3415 expires.

On the other hand, it is possible for the MME 42 according to the third embodiment to perform paging using two S-TMSIs in parallel although T3415 is operated. For this reason, it is possible for the MME 42 according to the third embodiment to increase the possibility that paging succeeds earlier than the operation in the present 3GPP.

In the following description, configuration examples of the UE 40 and the control apparatus 10 described in the above embodiments are described.

Figure 16:
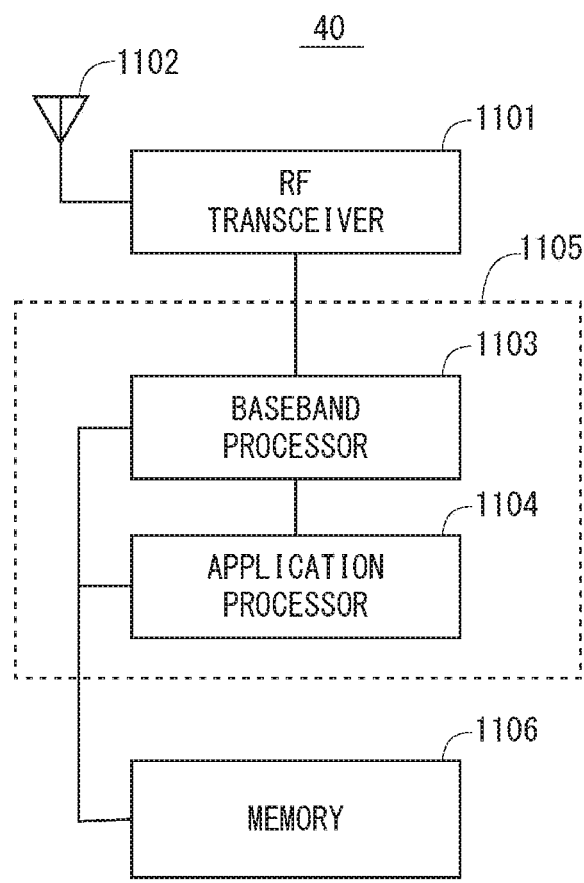
FIG. 16 is a configuration diagram of the UE according to each embodiment.

FIG. 16 is a block diagram showing a configuration example of the UE 40. A Radio Frequency (RF) transceiver 1101 performs analogue RF signal processing to communicate with a RAN 26. The analogue RF signal processing performed by the RF transceiver 1101 includes frequency up-conversion, frequency down-conversion, and amplification. The RF transceiver 1101 is coupled to an antenna 1102 and a baseband processor 1103. Specifically, the RF transceiver 1101 receives modulated symbol data (or Orthogonal Frequency Division Multiplexing (OFDM) symbol data) from the baseband processor 1103, generates a transmission RF signal, and supplies the transmission RF signal to the antenna 1102. The RF transceiver 1101 further generates a baseband reception signal based on a reception RF signal received by the antenna 1102 and supplies it to the baseband processor 1103.

The baseband processor 1103 performs digital baseband signal processing (data-plane processing) and control-plane processing for radio communication. The digital baseband signal processing includes (a) data compression/decompression, (b) data segmentation/concatenation, (c) composition/decomposition of a transmission format (transmission frame), (d) channel coding/decoding, (e) modulation (symbol mapping)/demodulation, and (f) generation of OFDM symbol data (baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1103 may include signal processing of a Packet Data Convergence Protocol (PDCP) layer, a Radio Link Control (RLC) layer, a MAC layer, and a PHY layer. In addition, the control-plane processing performed by the baseband processor 1103 may include processing of a Non-Access Stratum (NAS) protocol, an RRC protocol, and a MAC CE.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1104 described below.

The application processor 1104 may also be referred to as a CPU, an MPU, a microprocessor, or a processor core. The application processor 1104 may include a plurality of processors (processor cores). The application processor 1104 executes a system software program (Operating System (OS)) and various application programs (e.g., a voice call application, a WEB browser, a mailer, a camera operation application, and a music playback application) loaded from a memory 1106 or from another memory (not shown) to perform various functions of the UE 40.

In some implementations, as shown by a dashed line (1105) in FIG. 16, the baseband processor 1103 and the application processor 1104 may be integrated on a single chip. In other words, the baseband processor 1103 and the application processor 1104 may be implemented as a single System on Chip (SoC) device 1105. An SoC device may be referred to as a system Large Scale Integration (LSI) or a chipset.

The memory 1106 is a volatile memory, a nonvolatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disk drive, or any combination thereof. The memory 1106 may include, for example, an external memory device that can be accessed by the baseband processor 1103, the application processor 1104, and the SoC 1105. The memory 1106 may include an internal memory device that is integrated in the baseband processor 1103, the application processor 1104, or the SoC 1105. In addition, the memory 1106 may include a memory in a Universal Integrated Circuit Card (UICC).

The memory 1106 may store software modules (computer programs) including instructions and data to perform the processing of the UE 40 described in the above embodiments. In some implementations, the baseband processor 1103 or the application processor 1104 may be configured to load these software modules from the memory 1106 and execute them in order to perform the processing of the UE 40 described in the above embodiments.

Figure 17:
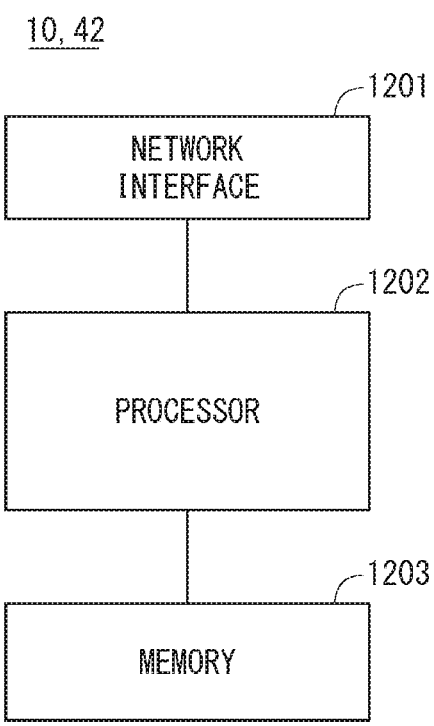
FIG. 17 is a configuration diagram of the control apparatus according to each embodiment.

FIG. 17 is a block diagram showing a configuration example of the control apparatus 10. Referring to FIG. 17, the control apparatus 10 includes a network interface 1201, a processor 1202, and a memory 1203. The network interface 1201 is used to communicate with network nodes (e.g., an MME 22 or an SGSN 24). The network interface 1201 may include, for example, a network interface card (NIC) conforming to the Institute of Electrical and Electronics Engineers (IEEE) 802.3 series.

The processor 1202 loads software (computer programs) from the memory 1203 and executes them to perform the processing of the control apparatus 10 described in the above embodiments with reference to the sequence diagrams and the flowchart. The processor 1202 may be, for example, a microprocessor, an MPU, or a CPU. The processor 1202 may include a plurality of processors.

The memory 1203 is constituted by a combination of a volatile memory and a non-volatile memory. The memory 1203 may include a storage arranged apart from the processor 1202. In this case, the processor 1202 may access the memory 1203 via an I/O interface (not shown).

In the example of FIG. 17, the memory 1203 is used to store software modules. The processor 1202 loads these software modules from the memory 1203 and executes them in order to perform the processing of the control apparatus 10 described in the above embodiments.

As described with reference to FIGS. 16 and 17, each of the processors included in the UE 40 and the control apparatus 10 according to the above embodiments executes one or more programs including instructions for causing a computer to perform the algorithm described with reference to the drawings. The programs can be stored in various non-transitory computer-readable media and supplied to a computer. The non-transitory computer-readable media include various tangible storage media. Examples of the non-transitory computer-readable media include magnetic recording media (for example, a flexible disk, a magnetic tape, and a hard disk drive), magneto-optic storage media (for example, a magneto-optic disk), a Compact Disc Read Only Memory (CD-ROM), a CD-R, a CD-R/W, and semiconductor memories (for example, a mask ROM, a Programmable ROM (PROM), an Erasable PROM (EPROM), a flash ROM, and a Random Access Memory (RAM)). The programs may be supplied to a computer by using various transitory computer-readable media. Examples of the transitory computer-readable media include electrical signals, optical signals, and electromagnetic waves. The transitory computer-readable media can be used to supply programs to a computer via a wired communication line, such as an electric wire and an optical fiber, or a wireless communication line.

The present disclosure is not limited to the above embodiments and modifications can be made as appropriate without departing from the scope thereof. The present disclosure may be implemented by combining the embodiments as appropriate.

The present invention has been described with reference the embodiments, but is not limited to the above. Various modifications that can be understood by those skilled in the art can be made to the configurations and the details of the present invention without departing from the scope of the invention This application is based upon and claims the benefit of priority of Japanese Patent Application No. 2016-199094 filed on Oct. 7, 2016, the disclosure of which is incorporated herein in its entirety by reference.

A part or all of the above embodiments may also be described as the following Supplementary Notes, but are not limited to the following.

(Supplementary Note 1)
A control apparatus comprising:
a communication means for performing a paging process using extended idle-mode Discontinuous Reception (DRX) (eDRX); and
a calculation means for determining a timing for paging using a first temporary identifier allocated to a communication terminal and a second temporary identifier allocated to the communication terminal and different from the first temporary identifier,
wherein the communication means performs a paging process using the first temporary identifier corresponding to a first timing for initial paging.

(Supplementary Note 2)
The control apparatus according to Supplementary note 1, wherein
the communication means performs, when there is no response to the paging process at the first timing, a paging process using the second temporary identifier corresponding to a second timing for next paging.

(Supplementary Note 3)
The control apparatus according to Supplementary note 1 or 2, further comprising a control means for starting a first timer when the paging process using the first temporary identifier is performed, wherein
the first timer is stopped when there is a response from the communication terminal before a predetermined period expires, and
the communication means performs the paging process using the second temporary identifier while the first timer is operated.

(Supplementary Note 4)
The control apparatus according to Supplementary note 3, wherein the control means extends an operation period of the first timer when the paging process using the second temporary identifier is performed while the first timer is operated.

(Supplementary Note 5)
The control apparatus according to Supplementary note 3, wherein the control means starts a second timer whose operation period is predetermined, when the paging process using the second temporary identifier is performed while the first timer is operated.

(Supplementary Note 6)
The control apparatus according to Supplementary note 2, further comprising a control means for staring a first timer when the paging process using the first temporary identifier is performed,
wherein the first timer is set to a period in which the paging processes at the first timing and the second timing are to be performed.

(Supplementary Note 7)
wherein the control apparatus transmits to the gateway device, using an S4 or S11 interface, a message for instructing a gateway device to buffer data for a longer period than a period in which the paging process using the first temporary identifier and the paging process using the second temporary identifier are to be performed.

(Supplementary Note 8)
The control apparatus according to any one of Supplementary notes 1 to 7, wherein
the first temporary identifier and the second temporary identifier each are a System Architecture Evolution (SAE) Temporary Mobile Subscriber Identity (S-TMSI) containing a Mobility Management Entity (MME) Temporary Mobile Subscriber Identity (M-TMSI), and
the M-TMSIs contained in the S-TMSIs of the temporary identifiers are different from each other.

(Supplementary Note 9)
The control apparatus according to any one of Supplementary notes 1 to 8, wherein the first timing and a second timing for the next paging when there is no response to the paging processes at the first timing, are determined according to an extended idle-mode Discontinuous Reception (DRX) (eDRX) cycle.

(Supplementary Note 10)
A paging method using extended idle-mode Discontinuous Reception (DRX) (eDRX), the method comprising:
determining a timing for paging using a first temporary identifier allocated to a communication terminal and a second temporary identifier allocated to the communication terminal and different from the first temporary identifier; and
performing a paging process using the first temporary identifier corresponding to a first timing for initial paging.

(Supplementary Note 11)
The paging method according to Supplementary note 10, further comprising performing, when there is no response to the paging process at the first timing, a paging process using the second temporary identifier corresponding to a second timing for the next paging.

(Supplementary Note 12)
The paging method according to Supplementary note 11, further comprising starting a first timer when the paging process using the first temporary identifier, wherein the first timer is set to a period in which the paging processes at the first timing and the second timing are to be performed.

(Supplementary Note 13)

A non-transitory computer-readable medium storing a program causing a computer to execute a paging process using extended idle-mode Discontinuous Reception (DRX) (eDRX), the program causing the computer to:

determine a timing for paging using a first temporary identifier allocated to a communication terminal and a second temporary identifier allocated to the communication terminal and different from the first temporary identifier; and perform a paging process using the first temporary identifier corresponding to a first timing for initial paging.

REFERENCE SIGNS LIST

10 Control apparatus
11 Calculator
12 Transceiver
20 Base station
30 Communication terminal
40 UE
41 E-UTRAN
42 MME
43 HSS
44 SGSN
45 SGW
46 PGW
47 PCRF
48 UTRAN
49 GERAN
50 Operator's IP Services
61 Transceiver
62 Controller

The invention claimed is:

1. A control apparatus in a core network, the control apparatus comprising:
at least one memory storing instructions; and
at least one processor configured to execute the instructions to:
perform a paging process for a terminal using extended idle-mode DRX (eDRX);
determine a timing for next paging from both a first GUTI (Globally Unique Temporary UE Identity) and a second GUTI during a period where before a GUTI Reallocation Complete message is received, wherein
the first GUTI is allocated to the terminal, and
the second GUTI is allocated to the terminal and different from the first GUTI; and
use an S-TMSI (System Architecture Evolution (SAE) Temporary Mobile Subscriber Identity) from either of the first GUTI or the second GUTI which leads earlier eDRX than the other of the first GUTI and the second GUTI for paging.

2. The control apparatus according to claim 1, wherein the at least one processor is further configured to execute the instructions to use, if no response is received to a paging attempt for the earlier eDRX, another S-TMSI from the other of the first GUTI and the second GUTI which leads later eDRX for paging.

3. The control apparatus according to claim 2, wherein the at least one processor is further configured to execute the instructions to:

start a timer T3415 for the paging procedure to perform the paging attempt for the earlier eDRX and a paging attempt for the later eDRX.

4. The control apparatus according to claim 3, wherein the at least one processor is further configured to execute the instructions to stop the timer T3415 when a response is received from the terminal.

5. The control apparatus according to claim 3, wherein the paging attempt for the later eDRX is initiated if the later eDRX comes during the earlier eDRX ongoing.

6. The control apparatus according to claim 3, wherein the timer T3415 is started when the paging attempt is for the earlier eDRX.

7. The control apparatus according to claim 3, wherein the at least one processor is further configured to execute the instructions to transmit to the gateway device, using an S4 or S11 interface, a message for instructing a gateway device to buffer data for a longer period than a period in which the paging attempt for the earlier eDRX and the paging attempt for the later eDRX are to be performed.

8. A paging method for a terminal using extended idle-mode (eDRX) performed by a control apparatus in a core network, the method comprising:
determining a timing for next paging from both a first GUTI (Globally Unique Temporary UE Identity) and a second GUTI during a period where before a GUTI Reallocation Complete message is received, wherein
the first GUTI is allocated to the terminal, and
the second GUTI is allocated to the terminal and different from the first GUTI; and
using a S-TMSI (System Architecture Evolution (SAE) Temporary Mobile Subscriber Identity) from either of the first GUTI or the second GUTI which leads earlier eDRX than the other of the first GUTI and the second GUTI for paging.

9. The paging method according to claim 8, further comprising using, if no response is received to a paging attempt for the earlier eDRX, another S-TMSI from the other of the first GUTI and the second GUTI which leads later eDRX for paging.

10. The paging method according to claim 9, further comprising starting a timer T3415 for the paging procedure to perform the paging attempt for the earlier eDRX and a paging attempt for the later eDRX.

11. A non-transitory computer-readable medium storing a program causing a computer to execute a paging process for a terminal using extended idle-mode DRX (eDRX), the program causing the computer to:
determine a timing for next paging from both a first GUTI (Globally Unique Temporary UE Identity) and a second GUTI during a period where before a GUTI Reallocation Complete message is received, wherein
the first GUTI is allocated to the terminal, and
the second GUTI is allocated to the terminal and different from the first GUTI; and
using a S-TMSI (System Architecture Evolution (SAE) Temporary Mobile Subscriber Identity) from either of the first GUTI or the second GUTI which leads earlier eDRX than the other of the first GUTI and the second GUTI.

12. The control apparatus as in any one of claims 1, 2, 3, 4, 5, 6, and 7, wherein the control apparatus is a MME (Mobility Management Entity).

* * * * *

UNITED STATES PATENT AND TRADEMARK OFFICE
CERTIFICATE OF CORRECTION

PATENT NO. : 11,012,935 B2  
APPLICATION NO. : 16/340052  
DATED : May 18, 2021  
INVENTOR(S) : Toshiyuki Tamura et al.

Page 1 of 1

It is certified that error appears in the above-identified patent and that said Letters Patent is hereby corrected as shown below:

In the Claims

At Column 18, Claim number 8, at the end of line number 21, should read:  
--idle-mode DRX (eDRX)--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*